United States Patent [19]

Pfaffmann et al.

[11] Patent Number: 4,894,501

[45] Date of Patent: * Jan. 16, 1990

[54] METHOD AND APPARATUS FOR INDUCTION HEATING OF GEAR TEETH

[75] Inventors: George D. Pfaffmann, Farmington; Norbert R. Balzer, Troy; George M. Mucha, Parma Hts.; Donald E. Novorsky, Pleasant Ridge, all of Mich.

[73] Assignee: Tocco, Inc., Boaz, Ala.

[ * ] Notice: The portion of the term of this patent subsequent to Jul. 12, 2005 has been disclaimed.

[21] Appl. No.: 318,347

[22] Filed: Mar. 2, 1989

Related U.S. Application Data

[63] Continuation-in-part of Ser. No. 185,588, Apr. 21, 1988, which is a continuation of Ser. No. 1,624, Jan. 8, 1987, Pat. No. 4,757,170, which is a continuation-in-part of Ser. No. 878,186, Jun. 25, 1986, Pat. No. 4,675,488.

[51] Int. Cl.$^4$ ............................................. H05B 6/14
[52] U.S. Cl. ................................ 219/10.43; 219/10.59; 219/10.75; 266/125; 266/129; 148/147
[58] Field of Search ............... 219/10.59, 10.57, 10.41, 219/10.43, 10.71, 10.75, 10.77; 266/124, 125, 126, 129; 148/147, 148, 150, 152

[56] References Cited

U.S. PATENT DOCUMENTS

| | | | |
|---|---|---|---|
| 2,167,798 | 8/1939 | Denneen et al. | 266/5 |
| 2,444,259 | 6/1948 | Jordan | 219/10.59 |
| 2,590,546 | 3/1952 | Kincaid et al. | 219/10.59 |
| 2,689,900 | 9/1954 | Redmond et al. | 219/10.75 |
| 3,446,495 | 3/1969 | Pfaffman et al. | 266/4 |
| 3,502,312 | 3/1970 | Douglass | 266/8 |
| 3,784,780 | 1/1974 | Laughlin et al. | 219/10.43 |
| 4,251,704 | 2/1981 | Masie et al. | 219/10.59 |
| 4,363,946 | 12/1982 | Busemann | 219/10.59 |
| 4,420,667 | 12/1983 | Lewis | 219/10.41 |
| 4,604,510 | 8/1986 | Laughlin et al. | 219/10.43 |
| 4,675,488 | 6/1987 | Mucha et al. | 219/10.43 |
| 4,757,170 | 7/1988 | Mucha et al. | 219/10.43 |
| 4,808,779 | 2/1989 | Cogley | 219/10.43 |

Primary Examiner—Philip H. Leung
Attorney, Agent, or Firm—Body, Vickers & Daniels

[57] ABSTRACT

A method and apparatus for induction heating and quench hardening of an undulating cylindrical surface, such as that defined by gear or sprocket teeth, provide a hardness pattern uniformly distributed to a controlled depth across and between the teeth surfaces by means of axial scanning of the workpiece relative to a single induction heating coil. A distinct final heating scanning process follows a preheating scanning process whereby preheating and final heating can be conducted at differing controlled axial velocities. Axial scanning of the workpiece repeatedly past a single inductor coil enables preheating and final heating of workpieces which cannot be axially shifted directly between separate inductor coils, such as internal planetary ring gears having a closed end or external gears having a flange or shoulder protruding radially from the cylindrical gear teeth surface.

47 Claims, 11 Drawing Sheets

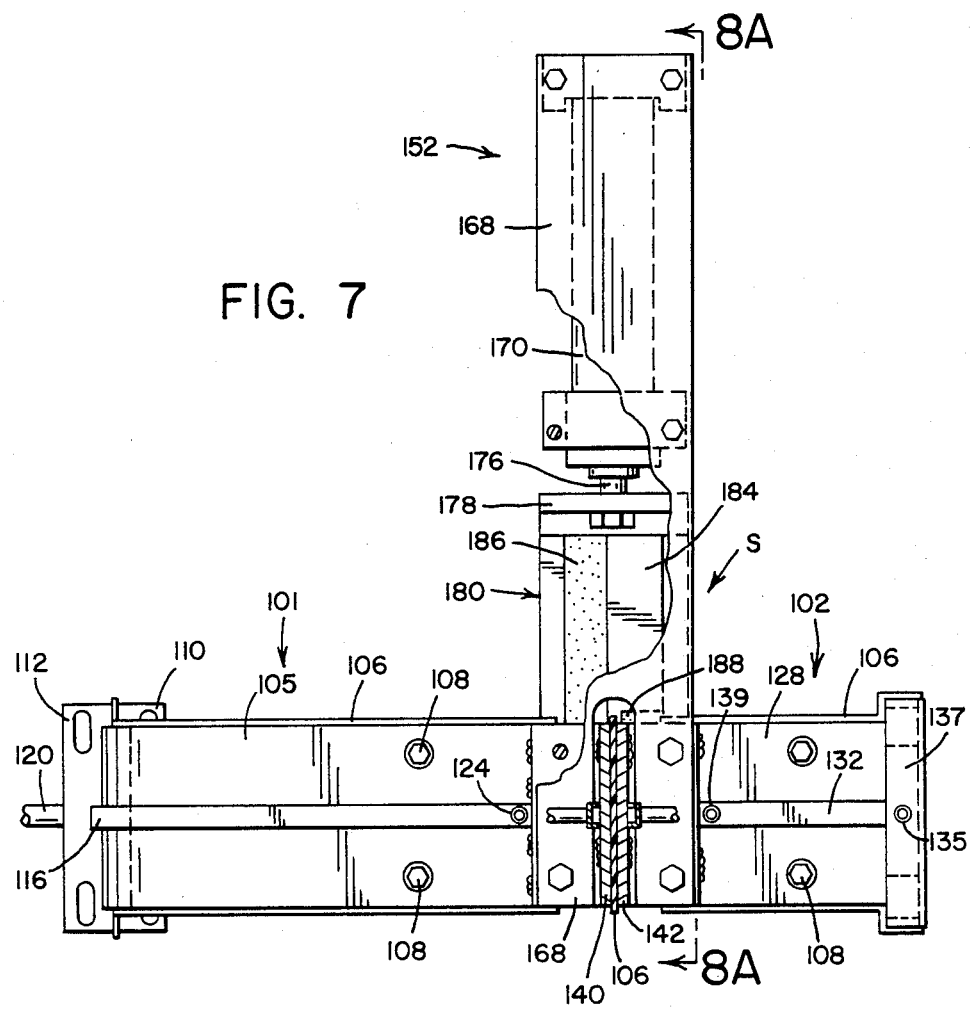

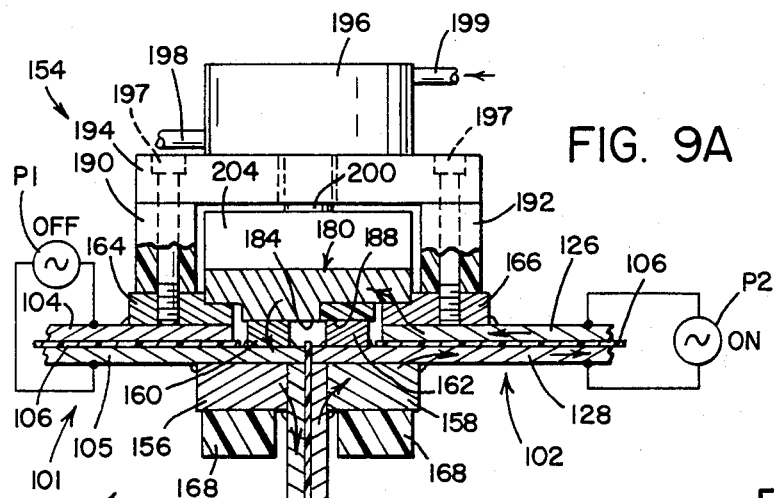
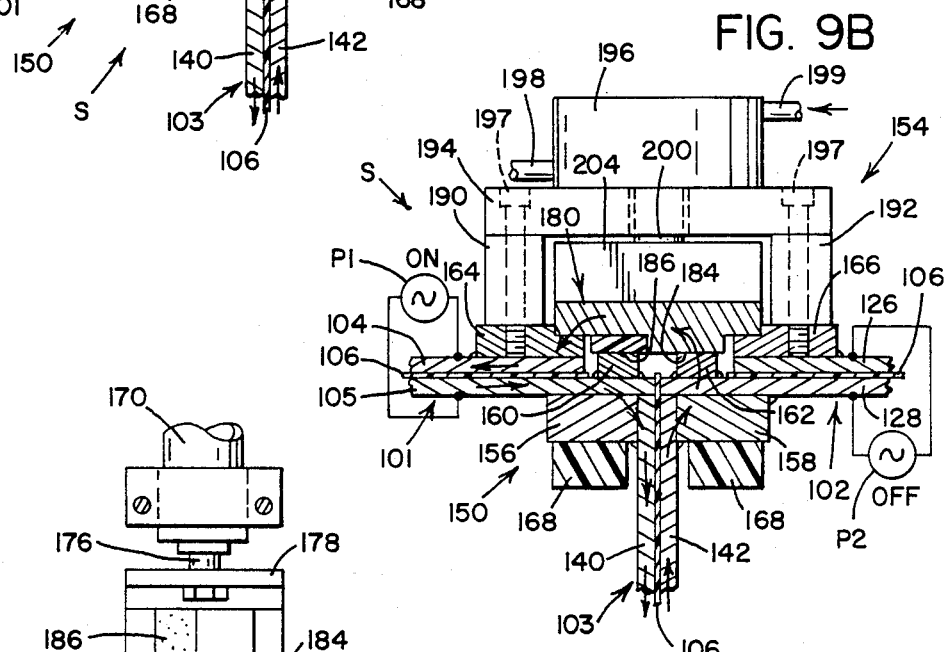
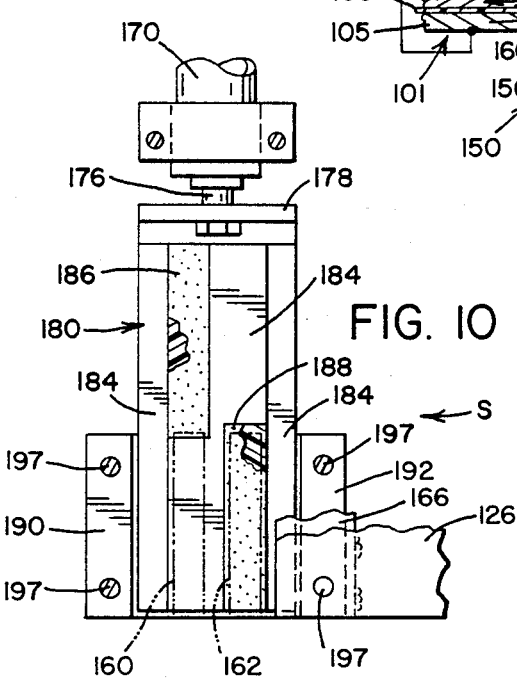

METHOD AND APPARATUS FOR INDUCTION HEATING OF GEAR TEETH

RELATED APPLICATIONS

This is a continuation-in-part of copending application Ser. No. 184,588 filed April 21, 1988, which is in turn a continuation of application Ser. No. 001,624, filed January 8, 1987, now U.S. Pat. No. 4,757,170, which is in turn a continuation-in-part of application Ser. No. 878,186 filed June 25, 1986, now U.S. Pat. No. 4,675,488.

The present invention relates to the art of induction heating and particularly to an improved method and apparatus for induction heating and quench hardening the toothed surface of a gear or similar workpiece.

BACKGROUND OF THE INVENTION

The invention is particularly applicable to inductively heating and quench hardening the cylindrical toothed surface of an axially elongated gear and will be described with particularly reference thereto. However, the invention has broader applications and may be used for inductively heating and quench hardening other elongated workpiece with a cylindrical surface generally concentric with a central axis and having an undulating cross-sectional outline, such as the outline defined by gear teeth. The invention is also particularly applicable to induction heating and quench hardening of the internal surface of an internal planetary ring gear, especially an internal planetary ring gear which is closed at one end and thus not able to be shifted directly between axially aligned inductor coils.

It is desirable to harden the toothed surface of a gear to enable that surface to withstand the wear and contact forces exerted during operation of a high power transmitting gear train. The surfaces to be hardened for resistance to contact forces exerted by intermeshing of other gears include the connecting surfaces between the gear teeth as well as the flanks and tips of the gear teeth themselves. The body of the gear beneath the hardened surface should remain relatively soft to provide strength and ductility to the gear structure. Ideally, the gear would have a hardness pattern extending to a uniform and shallow depth across the entire hardened surface to provide the resistance to surface abrasion associated with hardening while at the same time preserving the strength of the underlying material by avoiding the brittleness associated with hardening at the body of the gear beneath the gear teeth surfaces.

Previous methods of using induction heating to harden gear teeth have had limited success in obtaining the desired pattern of hardness extending to a shallow depth uniformly across the gear teeth surfaces. The material to be hardened must be raised above a transformation temperature and then quickly cooled by liquid quenching to induce hardening. Factors affecting the resulting hardness pattern include the depth to which the material is heated, the degree to which the heated temperature exceeds the transformation temperature, and the rate of cooling. A circular inductor coil closely spaced from the undulating gear teeth surface generally exposes the radially outer most regions of the gear teeth to a greater degree of induction heating than the connecting regions between the teeth, with the result that the temperature and depth of heating is correspondingly greater at the outer regions of the gear teeth. The differently heated regions will then be cooled at differing rates in the liquid quenching process, with the result that the hardness pattern developed thereby will be uneven across the gear teeth, with excessive hardening to depths beneath the gear teeth surfaces and with insufficient hardening at the connecting surfaces between the gear teeth. Accordingly, in order to successfully harden gear teeth by induction heating it is necessary to heat the gear to a preselected temperature uniformly to a controlled depth immediately before quench hardening.

A method of providing a hardness pattern to a uniform depth across the surface of gear teeth is shown in U.S. Pat. No. 4,675,488, also assigned to the present assignee and incorporated herein by reference. In that method a gear is closely received within an encircling inductor coil having an axial length or height corresponding to the axial length of the gear. The inductor coil is then energized with an alternating current having a frequency of less than about 50 KHz for a short period of time to preheat the gear. Heating depth in induction heating is inversely proportional to the current frequency at the inductor coil, whereby preheating at a relatively low frequency penetrates the gear to the base or roots of the teeth to heat a circular band extending around the gear beneath the gear teeth. This internal band is heated to an elevated temperature below the quench hardening transformation temperature of the metal material. A short time delay follows the preheating step to allow heat energy in the teeth to dissipate and thus to permit concentration of a high temperature and energy level within the band adjacent the roots of the teeth. Preferably, a second low frequency preheating step follows the time delay to further heat the underlying band and also to preliminarily heat the gear teeth surfaces to an elevated temperature. In this manner, the relatively low frequency preheating steps store and concentrate a high energy and high temperature at the internal band extending circumferentially through all of the root portions of the gear teeth. This internal band is at a higher temperature than the teeth themselves and is at a temperature substantially greater than the temperature of the underlying core of the gear. This preheated temperature profile is very dynamic and unstable, so the preheated gear is then immediately transferred into a second encircling inductor coil which is immediately energized with a high frequency current of greater than about 100 KHz for a short period of time. The applied high frequency current elevates the gear temperature above the quench hardening transformation temperature only to a shallow depth beneath the gear teeth surfaces. This shallow depth heating above the quench hardening transformation temperature is uniformly distributed throughout the gear teeth flanks and the connecting root portions since the internally heated band provides preheat energy at the connecting roots to enable them to attain the elevated final temperature along with the tooth flanks and tips more closely spaced from the inductor coil, and further inhibits an otherwise rapid conduction of heat from the tooth surfaces into the teeth and the core of the gear. The finally heated temperature profile is also highly unstable and dynamic and therefore is immediately followed by liquid quenching of the heated surfaces to bring the shallow depth of high temperature material below the transformation temperature whereby a uniform hardness pattern is provided at a corresponding shallow depth across the entire gear teeth surface.

The above described method successfully hardens gear teeth uniformly on their outwardly facing surfaces without causing brittleness due to excessive heating depth, and without leaving soft unhardened surfaces between the gear teeth due to lower temperatures before quench hardening. However, that patented method does not ideally enable hardening of gear teeth by means of induction heating and suffers from several disadvantages. The gears first move axial into an encircling induction heating coil for audio frequency heating during the two preheating cycles, and is then shifted axially into a second induction heating coil for final heating at the higher radio frequency current. The two axially spaced induction coils must each have an axially length exceeding the axial length of the gear so that the total gear will be heated at one time during both preheating and final heating. Since the temperature profiles obtained during practice of the method are highly unstable and dynamic, heating must occur very rapidly. The requirements for axial length and rapid heating ability at the inductor coils impose a requirement for a high power density over the elongated area being heated, which in turn imposes the requirement of a substantially high power rating for each inductor coil power supply. It is well known that as the rating of a power supply increases, especially an oscillator as used for radio frequencies above 100 KHz, the cost of the power supply drastically increases. For this reason, inductively heating gear teeth in accordance with the above described patented method is relatively expensive and sometimes impractical when the gears to be hardened are large, either in diameter or in axial length or height.

Another method previously patented by the present assignee overcomes many of the disadvantages associated with the above described method, yet is still not ideally efficient. That method, disclosed in U.S. Pat. No. 4,757,170, incorporated herein by reference, involves moving the gear progressively through two axially aligned inductor coils to preheat and then to finally heat the gear teeth surface progressively along its axial length, as opposed to heating the entire length of the gear distinctly and separately in the two coils as in the method described above. Progressive scanning along the length of the gear permits the induction coils to be of a narrower length or axial height, because at any one time the high power density required to impart the desired temperature profile needs only to be provided at a narrow band extending around the gear and corresponding to the width of the relatively axially moving inductor coil. Since heating is done progressively and simultaneously on the gear surface, the high power density results from the reduced size of the heating bands for both preheating and final heating, and does not require a substantially high power rating as is required to incrementally preheat and final heat the entire length of the gear. Accordingly, the latter described method overcomes the disadvantages of cost, efficiency, and workpiece length associated with the former described method.

However, there are still several disadvantages associated with practice of the latter method. The apparatus required to controllably move the workpiece through two separate coils is complex and expensive. Furthermore, simultaneous movement of the gear through the two coils necessarily imposes the same axial scanning velocity on both the preheating and the final heating processes. Controlled variations in the heating parameters employed in these two distinct heating processes are thus severely limited. Furthermore, a disadvantage attendant to practice of both of the aforementioned methods of induction heating and hardening of gear teeth is the fact that internal planetary ring gears which are often closed at one end cannot be coaxially shifted between or passed to separate inductor coils, nor can external gears with outwardly protruding flanges, shoulders, or the like. These patented methods are therefore limited in their applications to gears having external gear teeth and no substantial radial protrusions.

SUMMARY OF THE INVENTION

The present invention overcomes the above described disadvantages and others, and provides a method and apparatus for induction heating and quench hardening of an undulating circular surface, such as that defined by gear teeth, which do not require a high power rating and which provide a uniform hardness pattern to a shallow depth beneath the hardened surface for workpieces of various cross-sectional outlines, such as internal ring gears or external gears with radially protruding flanges or shoulders.

In accordance with a principal feature of the invention there is provided a method of hardening the teeth surface of an axially elongated gear having a central axis, the teeth surface including gear teeth and connecting roots, wherein the method comprises the steps of first progressively preheating the gear teeth surface along a first axially moving band sufficiently to heat the roots to a temperature below a quench hardening temperature, then progressively finally heating the preheated surface along a second axially moving band sufficiently to heat the preheated surface to a quench hardening temperature, while progressively quenching the finally heated surface immediately following the final heating thereof. In accordance with a more specific feature of the invention, the method includes the step of providing a coaxially aligned inductor coil having a circular surface closely spaced from the gear teeth surface, with the first and second axially moving heated bands being defined by relative axial movement of the inductor coil and the workpiece. The invention thus advantageously avoids the need for a high power rating by using a scanning process to inductively heat only a narrow band corresponding to the axial height of the inductor coil surface as opposed to an incremental heating process wherein the entire axial length of the gear teeth surface is inductively heated at once. The invention also accommodates variously shaped gears by conducting the preheating and final heating processes with axial movement relative to a single inductor coil, as opposed to using separate axially aligned inductor coils which could not both be passed by a gear having a closed end or a radially protruding shoulder, flange, or the like.

In accordance with another specific feature of the invention, the preheating process is conducted by moving the workpiece past the inductor coil in a first axial direction from an initial position to a terminal position, an indexing step is used to return the workpiece back from the terminal position to the initial position, and the final heating process is conducted by again moving the workpiece past the inductor coil in the same axial direction from the initial position to the terminal position. This sequence of axial movement advantageously enables the induction heating and hardening of an internal gear teeth surface, particularly for an internal gear which is closed at one end. Since the closed end prevents axial movement of the gear directly past separate inductor coils for the preheating and final heating processes, the invention is particularly applicable to such a workpiece in that the internal gear teeth surface is first preheated by moving the gear over the inductor coil from an initial position with the coil adjacent the open end of the gear to a terminal position with the coil adjacent the closed end, and is finally heated and quench hardened in a similar axial movement over the inductor coil after being indexed back from the terminal position to the initial position.

In accordance with another specific feature of the invention, the preheating step can be conducted with movement of the gear in one axial direction past the coil, and the final heating step can then be conducted with movement of the gear in the opposite direction past the coil without an intervening indexing step. Preferably, the workpiece is moved vertically, with the final heating process involving downward movement of the workpiece with relatively upward movement of the finally heated band, and with quench hardening liquid being applied relatively beneath the finally heated band.

Other specific features of the invention include performance of the preheating process with an alternating current having a frequency less than about 50 KHz and preferably less than about 10 KHz, and performance of the final heating process with an alternating current having a frequency greater than about 100 KHz and preferably greater than about 200 KHz. These frequencies advantageously provide a finally heated temperature profile uniformly distributed across the gear teeth surface to a shallow depth in preparation for quench hardening. A further specific feature of the invention involves static quenching of the entire workpiece following quench hardening to cool both hardened and unhardened portions of the workpiece.

In accordance with another principal feature of the invention there is provided an apparatus for inductively heating and quench hardening the gear teeth surfaces of an axially elongated gear having a central axis, the apparatus comprising a coaxially aligned circular inductor coil closely spaced from the gear teeth surface, a first power supply adapted to energize the inductor coil with a first alternating current having a frequency less than about 50 KHz, a second power supply adapted to energize the inductor coil with a second alternating current having a frequency greater than about 100 KHz, scanning means adapted to move the gear teeth surface relatively axially past the inductor coil repetitively in a progressive fashion, and switching means adapted to alternately connect the inductor coil with the first and the second power supplies. The apparatus economically and efficiently uses only a single inductor coil of relatively low power rating to inductively heat and quench harden the gear teeth surface uniformly to a shallow depth in separate preheating and final heating processes in accordance with the invention as described above, and advantageously accommodates workpiece shapes which cannot be axially shifted directly past separate inductor coils.

In accordance with a more specific feature of the invention there is provided a control means which is adapted to coordinate the switching means and the scanning means to connect the inductor coil with either the first or the second power supply during selected ones of the repeated relative axial movements, and which may further be adapted to turn the first and second power supplies on and off to prevent energization of the inductor coil during selected ones of the relative axial movements, such as during an indexing step between successive scanning steps. Importantly, the control means may conduct successive scanning steps in opposite axial directions and at differing axial velocities. The invention thus advantageously provides greater control over the parameters of the two separate heating processes than is available with the previously patented scanning method and apparatus described above.

The primary object of the present invention is to provide an improved method and apparatus for inductively heating and quench hardening an undulating circular surface, such as that defined by gear teeth, to yield a hardness pattern extending to a controlled depth uniformly distributed across the undulating surface.

Another object of the present invention is to provide a method and apparatus for inductively heating and quench hardening a gear teeth surface which do not require a high power rating at a power supply as is required in previously known systems.

Yet another object of the present invention is to provide a method and apparatus, as defined above, which use progressive axial scanning induction as opposed to incremental induction and which can accommodate workpieces of varying shapes and sizes.

Still another object of the present invention is to provide a method and apparatus, as defined above, which economically and efficiently use only a single induction heating coil in an axial scanning heating process.

A further object of the present invention is to provide a method and apparatus, as defined above, which provide independent control for separate axial scanning steps performed distinctly to preheat and to finally heat a workpiece.

These and other objects and advantages will become apparent from the following description of a preferred embodiment taken together with the accompanying drawings.

BRIEF DESCRIPTION OF THE DRAWINGS

FIG. 7 is a front elevational view taken along line 7—7 of FIG. 2;

FIG. 9A is a partial plan view taken along line 9A—9A of FIG. 8A;

FIG. 9B is a partial plan view showing an alternate position of the apparatus of FIG. 9A;

FIG. 10 is a partial elevational view taken along line 10—10 of FIG. 8A;

DESCRIPTION OF THE PREFERRED EMBODIMENT

Figure 1:
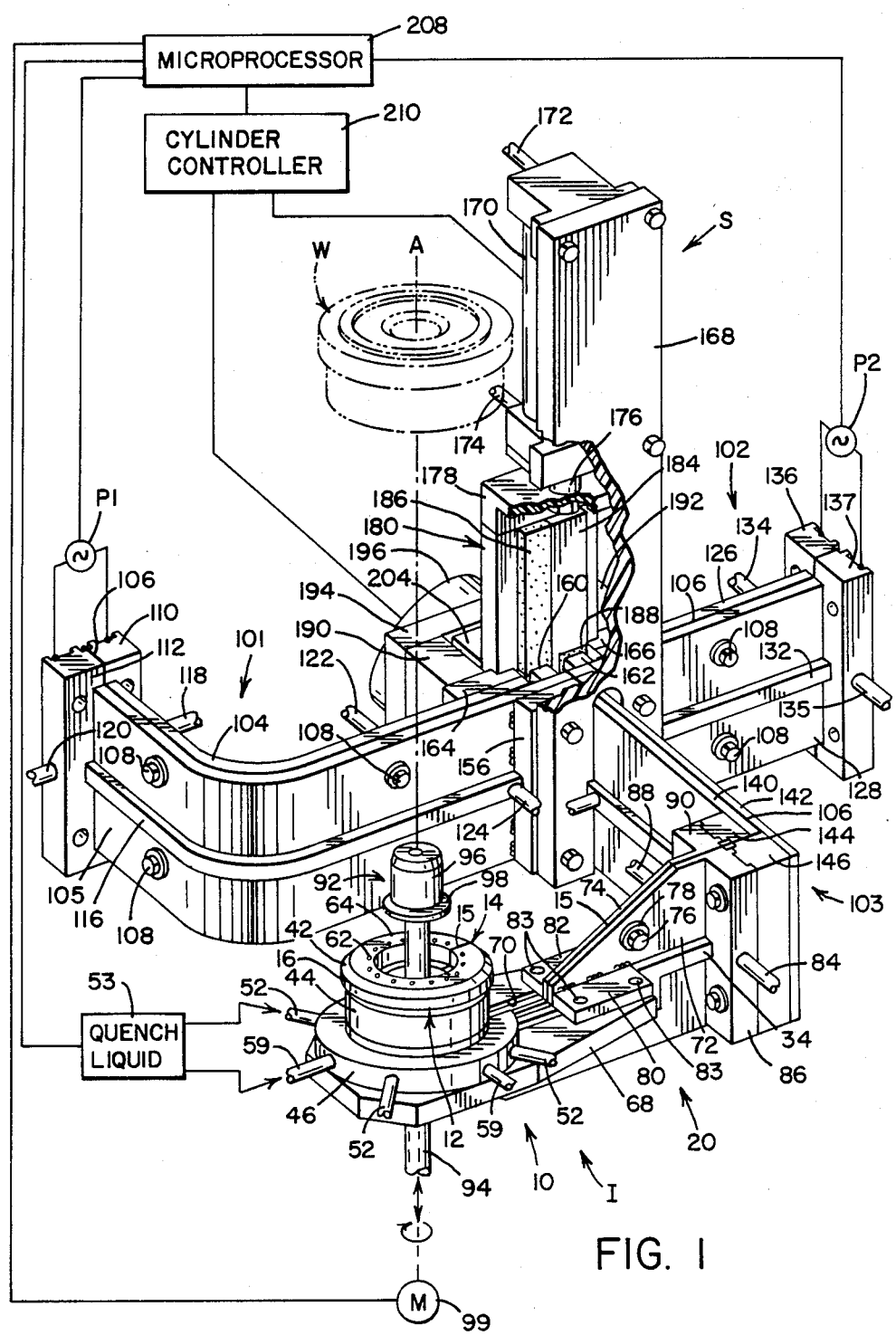
FIG. 1 is a pictorial view illustrating the preferred embodiment of the present invention.

Referring now to the drawings wherein the showings are for the purpose of illustrating a preferred embodiment of the invention only and not for the purpose of limiting same, in FIG. 1 there is shown an apparatus for progressively inductively heating and quench hardening the inner cylindrical gear teeth surface of a workpiece W. The apparatus is generally comprised of a first power supply P1, a second power supply P2, an inductor assembly I, and a switching assembly S adapted to alternately engage the inductor assembly I with either the first power supply P1 or the second power supply P2.

Referring specifically to FIGS. 3 through 6, the inductor assembly I is shown to comprise a coil support assembly 10 and an inductor bus assembly 20. The coil support assembly 10 includes a single turn inductor coil 12 extending substantially in a circle about an axis A with a gap 14 between the circumferentially opposite ends thereof. The inductor coil 12 includes an outwardly facing cylindrical surface 16, and a downwardly facing conical surface 18 including outwardly facing quench liquid holes 21. An internal member 22 defines a quench liquid conduit 24 extending circumferentially around the circular inductor coil 12, and with a cap ring 26 further defines a coolant conduit 28, also extending circumferentially around the inductor coil 12. The coolant conduit 28 includes coolant inlet and outlet openings 30 and 32 respectively communicating with coolant inlet and outlet tubes 34 and 36. The quench liquid conduit 24 includes four quench liquid inlet openings 38 each communicating with a quench liquid inlet passageway 40.

The coil support assembly 10 further includes an upper coil support block 42, a ring shaped block 44, a lower coil support block 46, and a central sleeve 48 clamping the block components together by means of machine screws 50. The quench liquid inlet passageways 40 extend through the block components of the coil support assembly 10 to communicate the quench liquid inlet openings 38 at the inductor coil 12 with quench liquids supply lines 52, which in turn communicate with a source of quenching liquid 53 shown schematically. O-ring seals 54, 56 are provided in the quench liquid passageways 40 as required. Also extending through the block members of the coil support assembly 10 are three static quench passageways 58 communicating static quench supply lines 59 with an annular channel 60. Static quench conduits 61 communicate the channel 60 with static quench openings 62 at the upper surface 64 of the upper coil support block 42. The lower coil support block 46 is mounted by means of bolts 66 onto an electrically nonconductive base plate 68, which includes a slot 70 aligned with the gap 14 in the inductor coil 12 and extending toward the inductor bus assembly 20.

The inductor bus assembly 20 includes a pair of inductor bus bars 72 and 74 held in adjacent positions by connecting bolts 76. The thin sheet of insulating material 15 disposed within the gap 14 of the inductor coil 12 extends as a whole or in sections from the gap 14 toward the inductor bus assembly 20 through the slot 70 in the base plate 68 and further between the inductor bus bars 72 and 74. The connecting bolts 76 are likewise electrically insulated as by means of nonconductive washers 78. The inductor bus bars 72 and 74 include mounting plates 80 and 82, respectively, for mounting of the base plate 68 of the coil support assembly 10 to the inductor bus assembly 20 by means of mounting bolts 83. The coolant inlet tube 34 extends along the inductor bus bar 72 from a coolant inlet supply opening 84 at a fishtail 86 to the coolant inlet opening 30 at the inductor coil 12. Likewise, the coolant outlet tube 36 extends along the adjacent inductor bus bar 74 from the coolant outlet opening 32 at the inductor coil 12 to a coolant outlet drain opening 88 at the adjacent fishtail 90. The coolant inlet and outlet tubes 34 and 36 are formed as flat sided copper tubes brazed against the outward flat sides of the inductor bus bars 72 and 74.

A workpiece support assembly 92 is associated with the coil support assembly 10 and the inductor bus assembly 20 to move the workpiece W with respect to the inductor coil 12. The workpiece support assembly 92 includes a vertical carrying shaft 94 coaxial with the coil 12 and upon which is mounted a mandrel 96 having a collar 98 adapted to carry the workpiece W as shown specifically in FIGS. 3 and 5. A vertical passageway 100 extends through the base plate 68, the lower coil support block 46, and the central sleeve 48 of the coil support assembly 10 to permit passage of the vertical carrying shaft 94 therethrough as shown. A motor 99 is adapted to impart vertical and rotational movement to the carrying shaft 94 in the passageway 100 in a manner to be described more fully hereinafter with reference to operation of the invention.

In addition to the inductor assembly I, the apparatus for inductively heating and quench hardening the inner gear teeth surface of the workpiece W in accordance with the invention further comprises the first power supply P1 connected to the switching assembly S by means of a first bus bar assembly 100, the second power supply P2 connected to the switching assembly S by means of a second bus bar assembly 102, and a third bus bar assembly 103 connecting the switching assembly S with the inductor assembly I.

Figure 2:
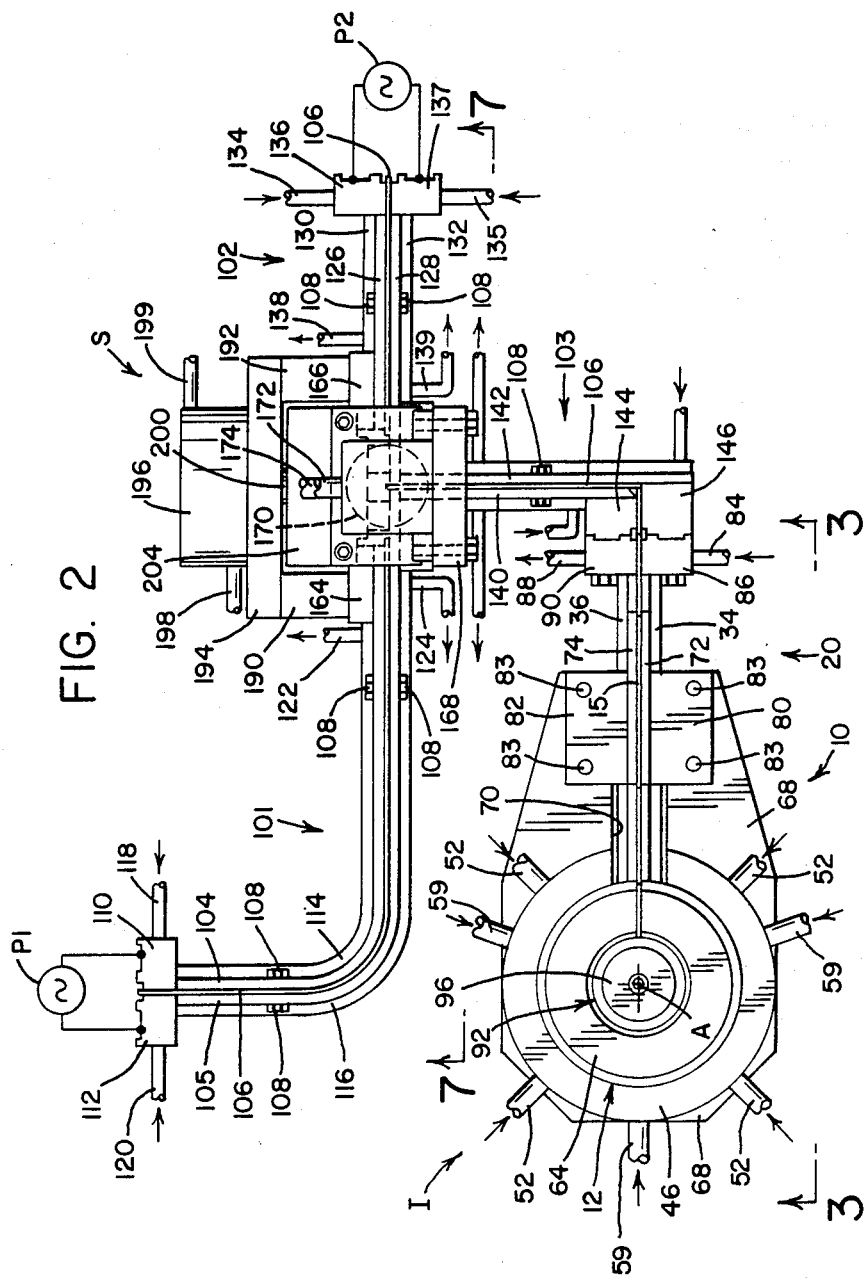
FIG. 2 is a top view of the apparatus of FIG. 1.

Referring more specifically to FIGS. 2 and 7, the first bus bar assembly 101 comprises a pair of adjacent bus bars 104 and 105 separated by a thin sheet of insulating material 106 and held in adjacent positions by bolts 108. Bus bars 104 and 105 extend from block ends 110 and 112, respectively, to terminal ends within the switching assembly S as shown in FIGS. 9A and 9B. Bus coolant tubes 114 and 116 each extend longitudinally along a bus bar 104, 105, respectively, from coolant inlet openings 118 and 120 at an associated block end to coolant outlet openings 122 and 124 adjacent the switching assembly S. The first power supply P1 is connected to the bus bars 104 and 105 across the block ends 110 and 112 and is adapted to provide an alternating current having a frequency of less than about 50 KHz at a power level of greater than about 100 KW.

The second bus bar assembly 102 is similarly comprised of a pair of bus bars 126 and 128 held by bolts 108 in adjacent positions opposite a sheet of the insulating material 106. Bus coolant tubes 130 and 132 extend respectively from bus coolant inlet openings 134 and 135 at associated block ends 136 and 137 to bus coolant outlet openings 138 and 139 adjacent the switching assembly S. The second power supply P2 is connected to the second pair of bus bars 126 and 128 across the second pair of block ends 136 and 137 and is adapted to provide an alternating current having a frequency greater than about 100 KHz at a power level greater than about 100 KW.

The third bus bar assembly 103 comprises a third pair of bus bars 140 and 142 likewise held by bolts 108 in adjacent positions opposite a thin sheet of the insulating material 106, and similarly include longitudinally extending bus coolant tubes. The third bus bars 140 and 142 extend from terminal ends within the switching assembly S to block ends 144 and 146 which are respectively connected to fishtails 86 and 90 of the inductor assembly bus bars 72 and 74.

Referring now to FIGS. 8A through 10, the switching assembly S is shown to generally comprise a contact assembly 150, a vertical cylinder frame assembly 152, and a horizontal cylinder frame assembly 154. As shown particularly in FIGS. 9A and 9B, the bus bar assemblies 101, 102, and 103 have terminal ends associated with the contact assembly 150. A permanent electrically conductive connection is made between the first bus bar assembly 101 and the third bus bar assembly 103 by means of a first bus connector 156 welded between the bus bar 105 at the first bus bar assembly 101 and the bus bar 140 at the third bus bar assembly 103. A permanent conductive connection is also made between the third bus bar assembly 103 and the second bus bar assembly 102 by means of a second bus connector 158 welded between the bus bar 142 and the bus bar 128. The first bus bar assembly 101 is partially isolated from the second bus bar assembly 102 by the electrically insulating material 106 extending from the third bus bar assembly 103 between the bus bars 105 and 128. Also welded to the bus bar 105 is a first brush 160, and similarly welded to the bus bar 128 is a second brush 162. Welded to the bus bar 104 is a third bus connector 164, and similarly welded to the bus bar 126 is a fourth bus connector 166.

Figure 8A:
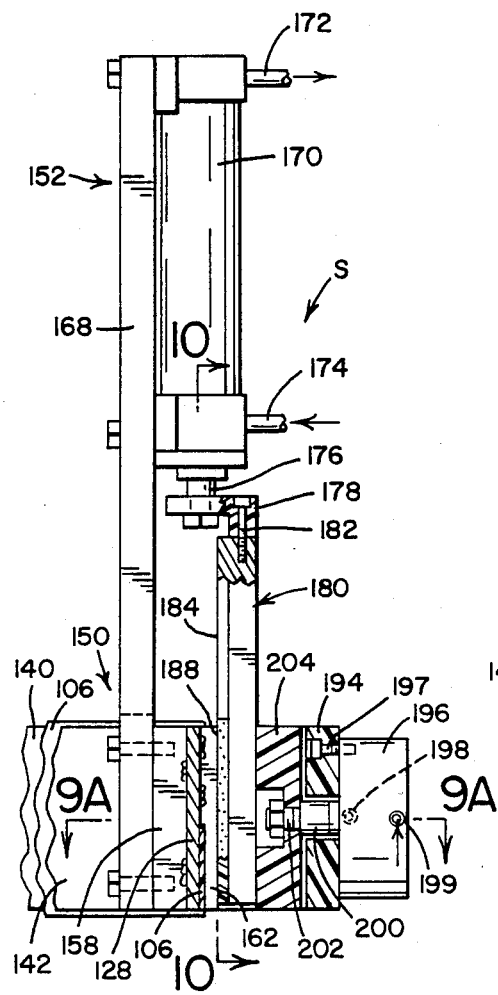
FIG. 8A is a side elevational view taken along line 8A—8A of FIG. 7.
Figure 8B:
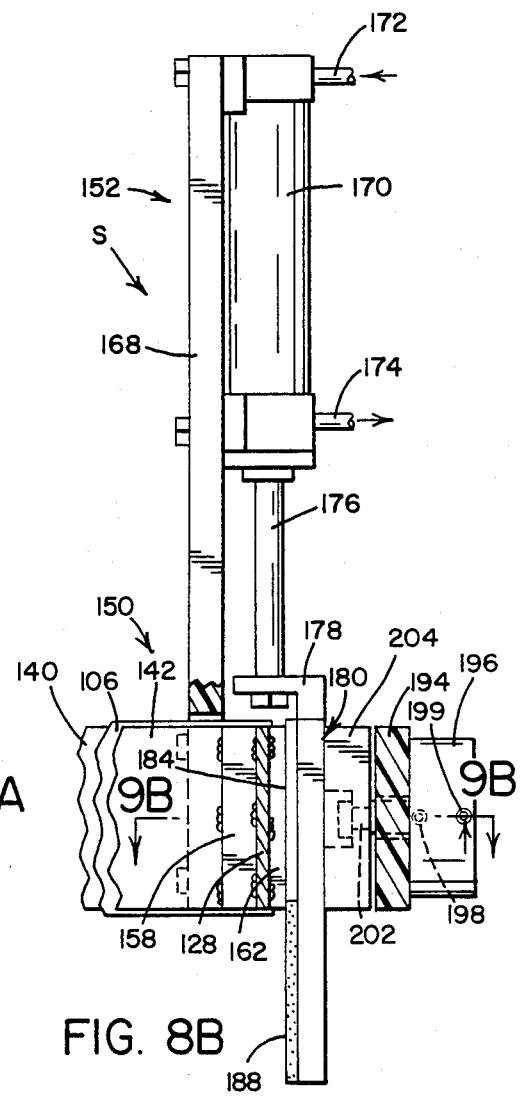
FIG. 8B is a side elevational view showing an alternate position of the apparatus of FIG. 8A.

Referring to FIGS. 8A and 8B, the switching assembly S is seen to further comprise a vertical cylinder frame assembly 152 comprising an upright member 168 upon which is mounted a vertical hydraulic fluid actuated cylinder 170 having hydraulic fluid nipples 172 and 174, and a vertical piston rod 176. The vertical piston rod 176 carries an electrically nonconductive bracket 178 to which is mounted a contact bar 180 by means of a machine screw 182. The contact bar 180 is shown in FIG. 10 to comprise a conductive surface area 184, a relatively narrow first insulator surface 186, and a relatively narrow second insulator surface 188 offset vertically and horizontally from the first insulator surface 186. The contact bar 180 is shiftable vertically with the piston rod 176 between a vertically raised position shown in FIG. 8A and a vertically lowered position shown in FIG. 8B. When in the vertically raised position, the second insulator surface 188 of the contact bar 180 is in facial contact with the second brush 162, and the electrically conductive surface 184 is in facial contact with the first brush 160, the third bus connector 164, and the fourth bus connector 166 as shown in FIG. 9A. When in the vertically lowered position, the first insulator surface 186 of the contact bar 180 is in facial contact with the first brush 160, and the electrically conductive surface 184 is in facial contact with the second brush 162, the third bus connector 164, and the fourth bus connector 166 as shown in FIG. 9B.

The switching assembly S further includes a horizontal cylinder frame assembly 54 including electrically nonconductive lateral frame members 190 and 192, and transverse frame member 194 to which is mounted a horizontal hydraulic fluid actuated cylinder 196 by means of bolts 197. The horizontal hydraulic cylinder 196 has a hydraulic fluid nipples 198 and 199, and a horizontal piston rod 200. Carried on the horizontal piston rod 200 by means of a bolt 202 is a pressure block 204 adapted to be urged horizontally against the vertically shiftable contact bar 182 to press the contact bar 180 firmly into facial contact with the various components of the contact assembly 150 as described above with reference to FIGS. 9A and 9B.

A microprocessor 208 is adapted to control the motor 99 to shift the workpiece vertically and to rotate the workpiece about the axis A; to control the quench liquid supplied from the source 53; and to control a cylinder controller 210 to operate the vertical hydraulic cylinder 170 and the horizontal hydraulic cylinder 196.

OPERATION

The apparatus as thus far described in accordance with the invention is particularly adapted for inductively heating and quench hardening the inwardly facing gear teeth surface of a cylindrical internal planetary ring gear having an open and a generally closed end, and operation in accordance with the preferred embodiment of the invention will be described with reference to such a workpiece.

The workpiece W includes an open end 210, a generally closed end 212, an inner cylindrical surface with raised gear teeth 214, and an inner flange face 216. As shown in FIGS. 12 through 15, the gear teeth include tops 218 and oppositely facing bearing surfaces 220 and 222, and are joined by connecting root surfaces 224. Internal regions of the workpiece W are designated generally as the tooth thickness area X, the root area Y, and the underlying body of the gear Z.

Figure 3:
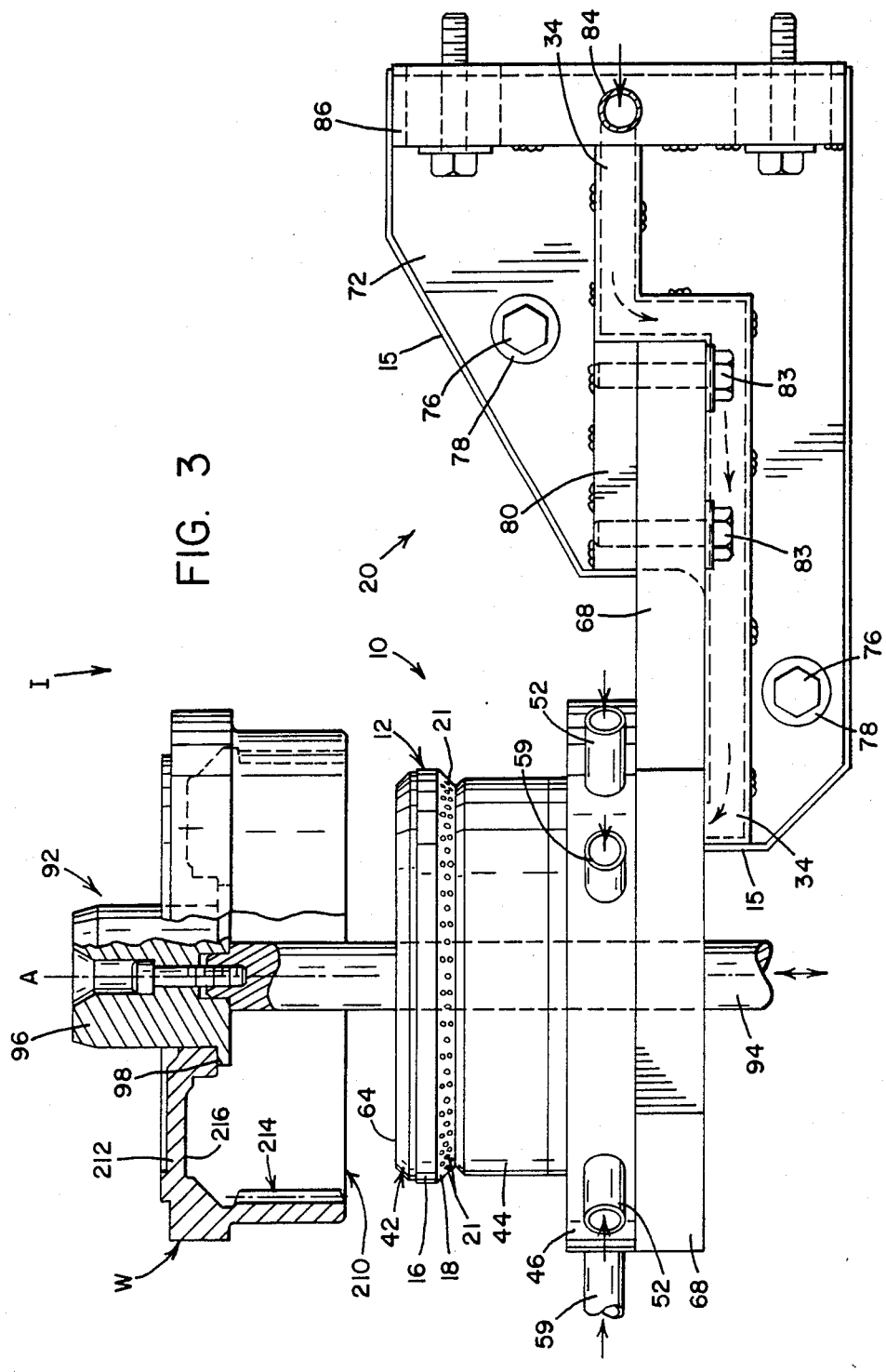
FIG. 3 is a front elevational view taken along line 3—3 of FIG. 2.
Figure 4:
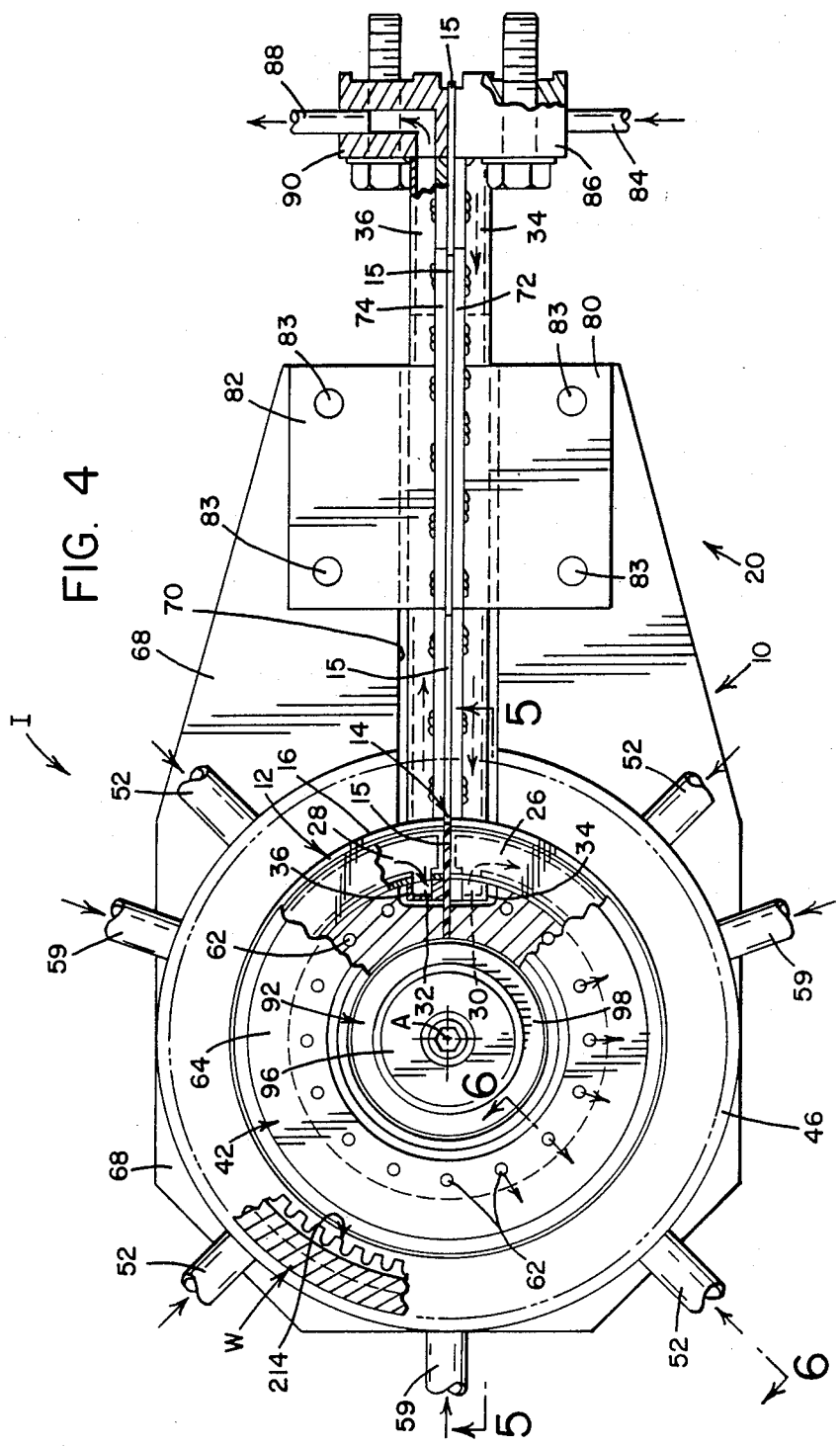
FIG. 4 is a top view of the apparatus of FIG. 3.
Figure 11:
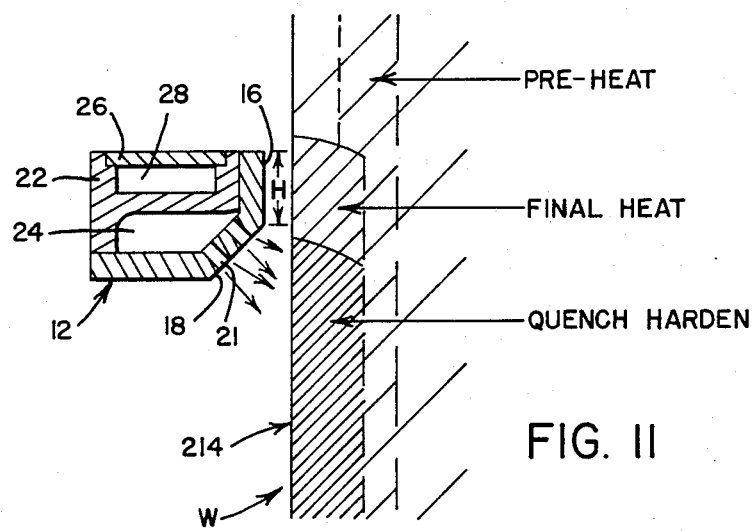
FIG. 11 is an enlarged, partial cross-section view of a workpiece approximately showing the progressive preheating, final heating, and quench hardening in accordance with the present invention.
Figure 12:
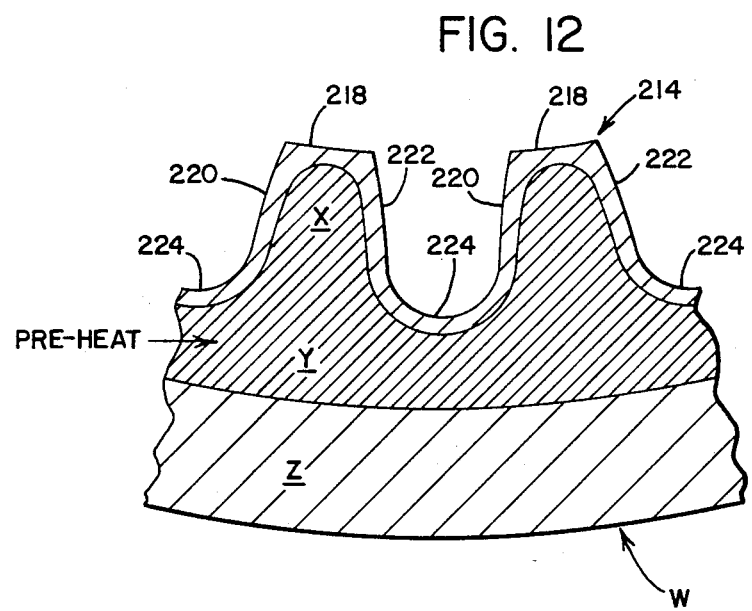
FIGS. 12-15 are partial cross-sectional views of a workpiece approximately showing the progressive stages of preheating and final heating in accordance with the present invention; and, FIG. 16 is a partial cross-sectional view of a workpiece approximately showing the final hardness pattern in accordance with the present invention.
Figure 13:
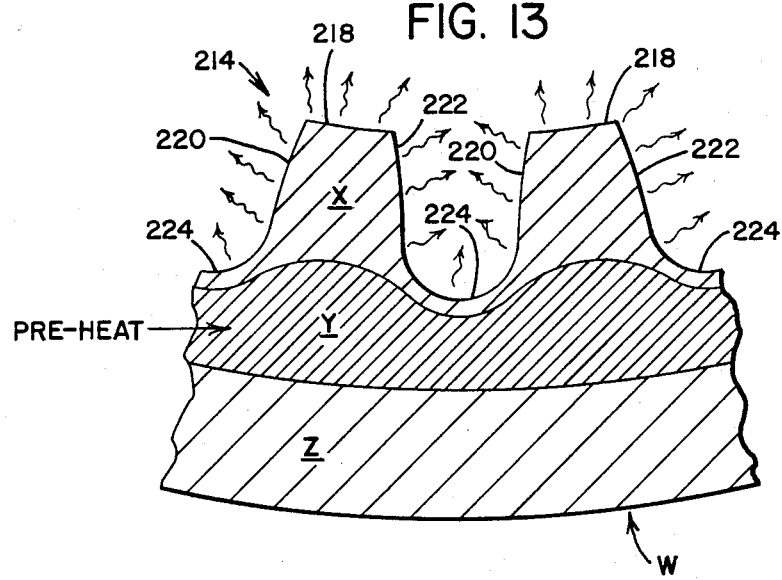
Figure 14:
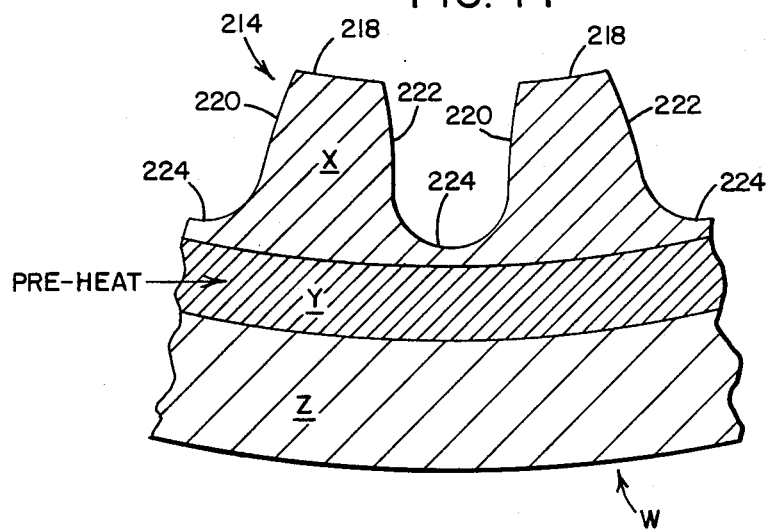

Operation of the method and apparatus begins with placement of the workpiece W on the mandrel 96 as shown in FIG. 3. Preheating of the workpiece W is carried out with the contact bar 180 in the vertically lowered position shown in FIG. 8B as controlled by the microprocessor 208 through the cylinder controller 210. The first power supply P1 is then directed by the microprocessor 208 to cause an alternating current to flow between the first bus bar assembly 101 and the third bus bar assembly 103 through the switching assembly S as indicated by the arrows in FIG. 9B. This first alternating current is at a power level greater than about 100 KW and at a frequency of less than about 50 KHz and preferably less than about 10 KHz. The motor 99 is then caused to move the workpiece W progressively past the inductor coil 12 from the raised position shown in FIG. 3 to the lowered position shown in broken lines in FIG. 5. Progressive movement of the workpiece W past the inductor coil 12 causes the inner cylindrical surface 214 to be preheated to a temperature below a quench hardening temperature along an axially moving band corresponding to the axial height H of the outwardly facing cylindrical surface 16 of the coil 12 as shown schematically in FIG. 11. Specifically, preheating at the relatively low frequency provided by the first power supply P1 causes heat to penetrate the workpiece W through the tooth thickness area X and the root area Y as shown in FIG. 12. However, the gear remains substantially unheated at the underlying structural body area Z. The initial preheated profile shown in FIG. 12 is dynamic and quickly shifts to the preheated profile shown in FIG. 14 by means of dissipation of heat energy outwardly from the surfaces of the gear teeth as shown in FIG. 13. A continuous preheated band underlying the tooth thickness areas X and connecting the root areas Y is thereby generated by the preheating step.

Immediately following preheating with generation of the internal circular heated band under the first power supply P1, the apparatus is quickly shifted over for final heating of the gear teeth surfaces under the second power supply P2. The first power supply P1 is turned off and the workpiece W is quickly indexed back upwardly to a position with the open end 210 adjacent the conductor coil 12. Withdrawal of the horizontal piston rod 200 by the horizontal cylinder 196 releases the pressure imposed on the contact bar 180 by the pressure block 204 to permit the vertical cylinder 170 to shift the vertical piston rod 176 and the contact bar 180 upwardly to the raised vertical position shown in FIG. 8A. The horizontal piston rod 200 is then extended from the horizontal cylinder 196 to urge the pressure block 204 against the contact bar 180 and thereby to firmly press the contact bar 180 against the associated components of the contact assembly 150 to prevent arcing therebetween. The second power supply P2 is then turned on to cause an alternating current to flow from the second bus bar assembly 102 to the third bus bar assembly 103 and the inductor assembly I through the switching assembly S as indicated by the arrows shown in FIG. 9A.

Figure 15:
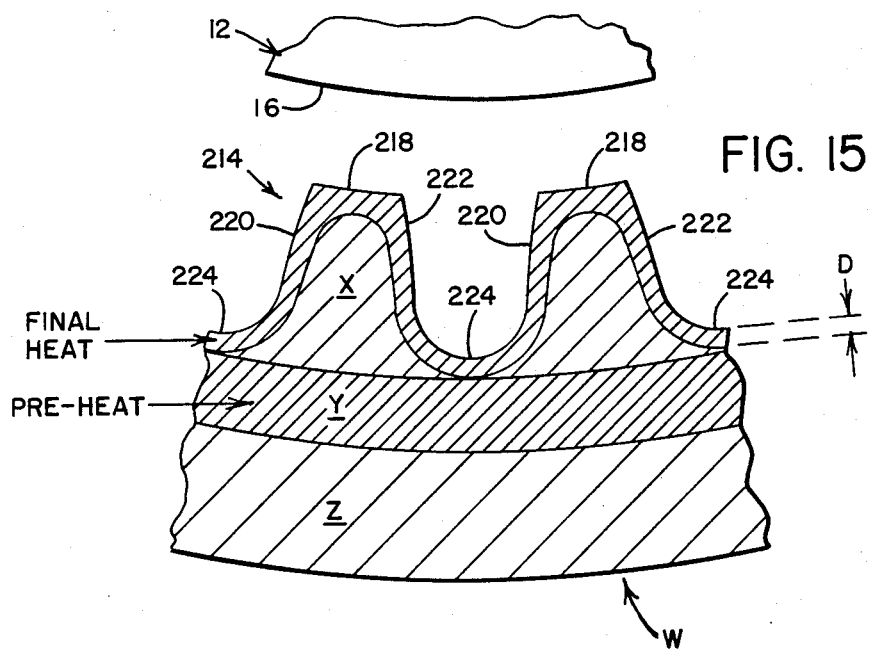
Figure 16:
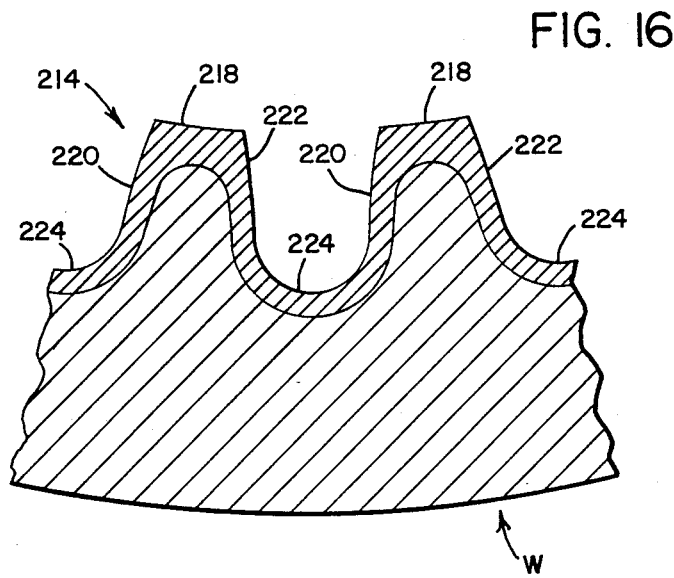

Final heating of the gear teeth surfaces proceeds with the workpiece W progressively moved downwardly past the conductor coil 12 by the motor 99 at a controlled velocity to progressively finally heat to a temperature above a quench hardening temperature an axially moving band corresponding to the axial height H of the outwardly facing cylindrical surface 16 of the coil 12. Simultaneously, quenching liquid is directed from the quench liquid source 53 through the coil support assembly 10 and outwardly from the quench liquid holes 20 as shown in FIG. 11 to quench harden the finally heated gear teeth surfaces immediately following the axially moving finally heated band. More specifically, final heating is initiated upon the heated profile shown in FIG. 14 wherein the preheated internal band extends beneath the tooth thickness areas X and across the root areas Y. The relatively high frequency of the alternating current provided by the second power supply P2 causes heat to penetrate only to the relatively shallow depth D shown in FIG. 15. Importantly, the preheated internal band enables high frequency final heating to penetrate to the depth D at the connecting root surfaces 224 which are spaced radially farthest from the inductor coil surface 16 as well as at the bearing surfaces 220, 222 and the top surfaces 218, because the internal heated band provides thermal energy at the connecting root regions which serves to reduce the electrically resistivity in those regions and consequently to enable the induced current to flow between the adjacent teeth surfaces as well as across those surfaces. The preheated internal band also inhibits rapid conduction of the final heat into the tooth thickness areas X and the underlying area Z. The inner cylindrical surface 214 of the workpiece W is thereby finally heated uniformly to a depth D as shown in FIG. 15. Quench hardening immediately following final heating produces the uniform hardness pattern shown in FIG. 16.

Figure 5:
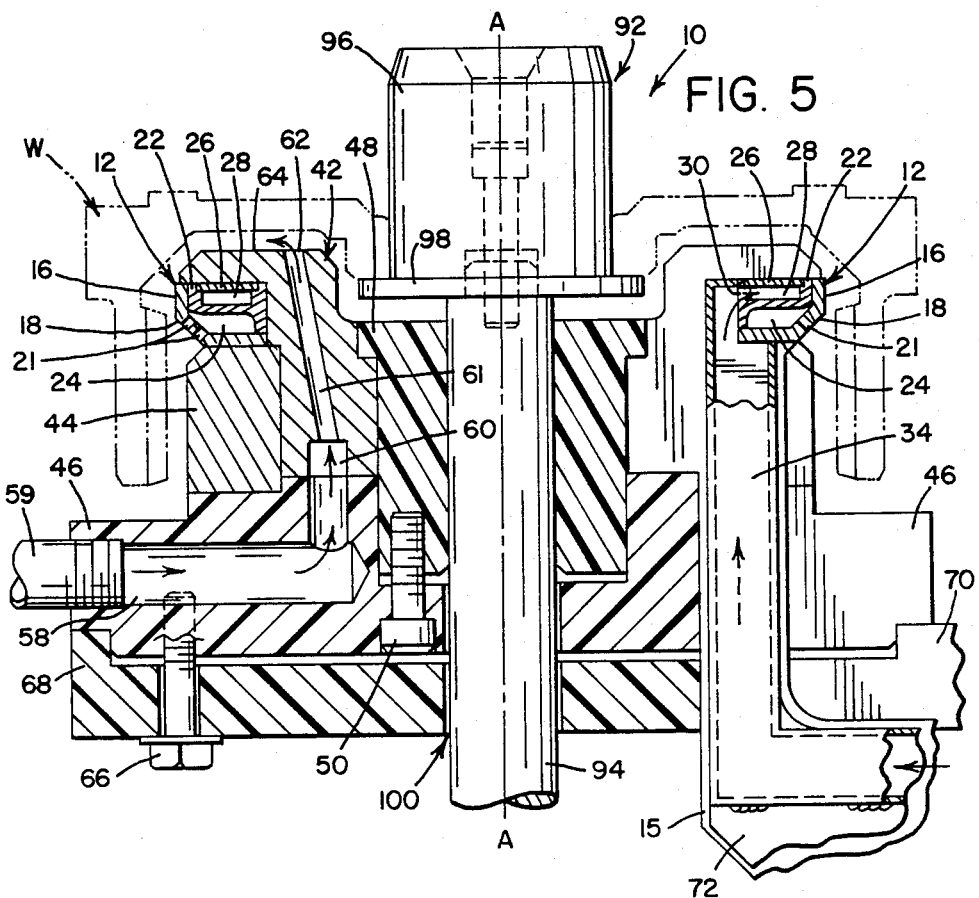
FIG. 5 is an enlarged sectional view taken along line 5—5 of FIG. 4.
Figure 6:
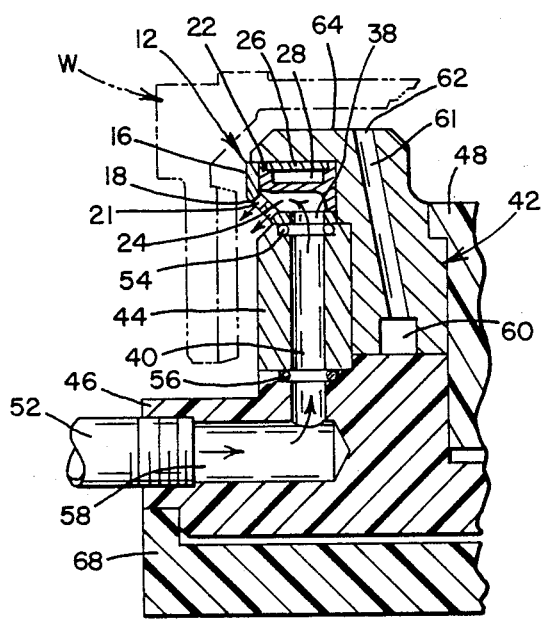
FIG. 6 is a partial enlarged sectional view taken along line 6—6 of FIG. 4.

A static quenching process may follow the final heating and quench hardening process to fully cool the entire workpiece in order to prevent excessive conduction of heat to the closed end 212 and to capture the final hardness pattern. When the workpiece reaches the terminal position as shown in FIG. 5, the microprocessor 208 causes a flow of quenching liquid from the source 53 through the coil support assembly 10 and outwardly from the static quench openings 62 to cool the workpiece with a flooding effect. An important feature of the invention is the fact that the preheating and final heating scanning processes can be conducted at differing axial velocities in order to accommodate various workpiece geometries which may require more or less time to obtain the desired preheated and finally heated temperature profiles. Furthermore, variations can be made in the sequence and conduct of the steps involved in operation of the method and apparatus without departing from the scope of the invention. For example, the preheating process may comprise two scanning passes of the workpiece past the inductor coil, with or without a short delay therebetween to permit dissipation of heat from the gear teeth as described with reference to FIG. 14. Scanning past the inductor coil can further be varied by moving the workpiece upwardly for preheating and then back downwardly for final heating to avoid an indexing step therebetween, or to follow any sequence of axial scanning and/or indexing motions calculated to apply to a particular workpiece geometry the preheating and final heating processes in accordance with the invention.

The invention has been described with reference to the preferred embodiment. Obviously modifications and alterations will occur to others upon the reading and understanding of this specification. It is intended to include all such modifications insofar as they come within the scope of the appended claims or the equivalents thereof.

Having thus described the invention, it is claimed:

1. A method of hardening the undulating generally circular teeth surface of an axially elongated gear having a central axis, said teeth surface including teeth and connecting roots, said method comprising the steps of:
   (a) providing an inductor coil coaxially aligned with said gear and having a circular inductor surface closely spaced from said teeth surface;
   (b) causing first relative axial movement between said inductor surface and said teeth surface to define a first axially moving band area at said teeth surface corresponding to said inductor surface;
   (c) progressively preheating said teeth surface along said first axially moving band area sufficiently to heat said roots to a temperature below a quench hardening temperature;
   (d) causing second relative axial movement between said inductor surface and said teeth surface to define a second axially moving band area at said teeth surface corresponding to said inductor surface;
   (e) progressively finally heating said preheated surface along said second axially moving band sufficiently to heat said preheated surface to a quench hardening temperature; and,
   (f) quenching said finally heated surface immediately following said final heating thereof.

2. The method defined in claim 1 wherein said quenching step comprises progressively quenching said finally heated surface along a third axially moving band defined by relative axial movement between said inductor surface and said teeth surface to follow said second axially moving band.

3. The method defined in claim 2 wherein said quenching step further comprises static quenching of said teeth surface following said progressive quench hardening.

4. The method defined in claim 1 wherein said first moving step comprises moving said workpiece past said inductor in a first axial direction from an initial position to a terminal position; said second moving step comprises moving said workpiece past said inductor in said first axial direction from said initial position to said terminal position; and further comprising the step of:
   (g) indexing said workpiece back from said terminal position to said initial position immediately following said first moving step.

5. The method defined in claim 4, wherein said workpiece is a hollow cylinder having an open end, with said teeth surface facing radially inwardly; and said circular inductor surface is provided radially inwardly of said teeth surface through said open end.

6. The method defined in claim 5, wherein said workpiece has a generally closed end blocking passage of said inductor, and said terminal position is defined with said closed and closely axially spaced from said inductor.

7. The method defined in claim 4, wherein said progressive preheating step is performed at a frequency less that about 50 KHz.

8. The method defined in claim 4, wherein said progressive final heating step is performed at a frequency greater than about 100 KHz.

9. The method defined in claim 4, wherein said progressive preheating step is performed at a frequency less than about 50 KHz and said progressive final heating step is performed at a frequency greater than about 100 KHz.

10. The method defined in claim 1 wherein said first moving step comprises moving said workpiece in a first axial direction past said inductor from an initial position to a terminal position; and said second moving step comprises moving said workpiece back from said terminal position in the opposite axial direction.

11. The method defined in claim 10, wherein said workpiece is a hollow cylinder having an open end, with said teeth surface facing radially inwardly; and said circular inductor surface is provided radially inwardly of said teeth surface through said open end.

12. The method defined in claim 11, wherein said workpiece has a generally closed end blocking passage of said inductor, and said terminal position is defined with said open end closely axially spaced from said inductor.

13. The method defined in claim 1 wherein said progressive preheating step is performed at a frequency less than about 50 KHz.

14. The method defined in claim 1 wherein said progressive final heating step is performed at a frequency greater than about 100 KHz.

15. The method defined in claim 1 wherein said progressive preheating step is performed at a frequency less than about 50 KHz and said progressive final heating step is performed at a frequency greater than about 100 KHz.

16. The method defined in claim 1 wherein said first moving step comprises relative movement between said workpiece and said coil at a first predetermined velocity, and said second moving step comprises relative movement between said workpiece and said coil at a second predetermined velocity differing from said first predetermined velocity.

17. A method of hardening the radially protruding undulating surface of a generally cylindrical workpiece adapted to rotate about a central axis generally concentric with said undulating surface, said undulating surface having radial protrusions with tips defining a radially extreme circle, said method comprising the steps of:
   (a) providing an induction heating inductor having a circular inductor surface generally matching said radially extreme circle in a position coaxially aligned with and closely spaced from said circle;
   (b) energizing said inductor with a first alternating current with a frequency of less than about 50 KHz;
   (c) relatively axially moving said workpiece with said radially extreme circle moving past said circular inductor surface to progressively inductively preheat said workpiece at said undulating surface to a temperature below a quench hardening temperature;
   (d) energizing said inductor with a second alternating current with a frequency of greater than about 100 KHz;
   (e) relatively axially moving said workpiece with said radially extreme circle moving past said circular surface to progressively inductively finally heat said preheated workpiece at said undulating surface to a quench hardening temperature; and,
   (f) progressively quench hardening said undulating surface immediately following said final heating.

18. The method defined in claim 17, wherein said final heating step finally heats said preheated workpiece along a moving heated band generally axially corresponding to said circular inductor; and said quenching step comprises quenching a moving quenched band immediately following said moving heated band.

19. The method defined in claim 18, wherein said preheating step comprises moving said workpiece in a first axially direction from an initial position to a terminal position; said final heating step comprises moving said workpiece in said axial direction from said initial position to said terminal position; and further including the step of;
   (g) indexing said workpiece back from said terminal position to said initial position immediately following said preheating step.

20. The method defined in claim 19, wherein said workpiece is a hollow cylinder having an open end, with said radially extreme circle being a radially inner circle; and said circular inductor surface is provided radially inwardly of said radially extreme circle through said open end.

21. The method defined in claim 20, wherein said workpiece has a generally closed end blocking passage of said inductor, and said terminal position is defined with said closed end closely axially spaced from said inductor.

22. The method defined in claim 21, wherein said quenching step further comprises a static quenching of said quench hardened surfaces following said progressive quench hardening.

23. The method defined in claim 19, further including the step of:

(h) rotating said piece during said preheating and final heating steps.

24. The method defined in claim 19, wherein said first frequency is in the range of 1 to 10 KHz.

25. The method defined in claim 19, wherein said second frequency is above 200 KHz.

26. The method defined in claim 18, wherein said preheating step comprises moving said workpiece in a first axial direction from an initial position to a terminal position, and said final heating step comprises moving said workpiece back from said terminal position in the opposite direction.

27. The method defined in claim 26, whrein said workpiece is a hollow cylinder having an open end, with said radially extreme circle being a radially inner circle; and said inductor surface is provided radially inwardly of said radially extreme circle through said open end.

28. The method defined in claim 27, wherein said workpiece has a generally closed end blocking passage of said inductor, and said terminal position is defined with said closed end closely axially spaced from said inductor.

29. The method defined in claim 28, wherein said quenching step further comprises a static quenching of said quench hardened surfaces following said progressive quench hardening.

30. The method defined in claim 26, further comprising step of:
(g) rotating said workpiece during said preheating and final heating steps.

31. The method defined in claim 26, wherein said first frequency is in the range of 1 to 10 KHz.

32. The method defined in claim 26, wherein said second frequency is above 200 KHz.

33. The method defined in claim 17, further including the step of providing switching means for selectively energizing said inductor with said first and second alternating currents.

34. A method of hardening the surfaces of radially inwardly protruding gear teeth of an axially elongated internal gear having an open end and a generally closed end, said method comprising the steps of:
(a) providing a coaxially aligned inductor having a circular surface closely spaced from said gear teeth surface;
(b) energizing said inductor with a first alternating current with a frequency of less than about 50 KHz;
(c) causing relative movement of said inductor and said workpiece whereby said inductor moves from an initial position adjacent said open end to a terminal position adjacent said generally closed end to progressively inductively preheat said workpiece at a portion adjacent said gear teeth surfaces to a temperature below a quench hardening temperature;
(d) causing relative movement of said inductor and said workpiece whereby said inductor moves from said terminal position back to said initial position;
(e) energizing said inductor with a second alternating current with a frequency of greater than about 100 KHz;
(f) causing relative movement of said inductor and said workpiece again to move said inductor from said initial position to said terminal position whereby said gear teeth surfaces are finally heated to a quench hardening temperature; and,
(g) progressively quench hardening said gear teeth surfaces immediately following said final heating.

35. The method defined in claim 34, wherein the succession of steps (c) and (d) is performed twice before performance of step (e).

36. The method defined in claim 34, further comprising the step of:
(h) static quenching said gear teeth surface following said progressive quench hardening thereof.

37. An apparatus for inductively heating and quench hardening the gear teeth surfaces of an axially elongated gear having a central axis, said gear teeth surfaces comprising radially projecting gear teeth and connecting roots, said apparatus comprising:
(a) an induction heating inductor having a circular inductor coil surface;
(b) first power supply means having a first electrical connection to said inductor for energizing said inductor coil surface with a first alternating current with a frequency of less than about 50 KHz;
(c) second power supply means having a second electrical connection to said inductor for energizing said inductor coil surface with a second alternating current with a frequency of greater than about 100 KHz;
(d) scanning means for moving said gear teeth surface relatively axially past said inductor coil surface repetitively in a progressive fashion; and,
(e) switching means for alternately interrupting and reestablishing said first and second electrical connections between said inductor coil and said first and second power supply means.

38. The apparatus defined in claim 37, further including control means for coordinating said switching means with said scanning means to establish either said first or said second electrical connections during selected ones of said repeated relative axial movements.

39. The apparatus defined in claim 38, further including means for turning said first and second power supply means on and off to prevent energization of said inductor coil surface during selected ones of said relative axial movements.

40. The apparatus defined in claim 38, further including means for controlling said scanning means to conduct successive ones of said repeated axial movements at differing controlled velocities.

41. The apparatus defined in claim 38, further including means for controlling said scanning means to conduct successive ones of said repeated axial movements in opposite axial directions.

42. The apparatus defined in claim 38, further including means for controlling said scanning means to produce a delay of a controlled duration between successive ones of said repeated axial movements.

43. The apparatus defined in claim 38, wherein said circular inductor coil surface faces radially outwardly.

44. The apparatus defined in claim 37, further including means for controlling said scanning means to conduct successive ones of said repeated axial movements at differing controlled velocities.

45. The apparatus defined in claim 37, further including mens for controlling said scanning means to conduct successive ones of said repeated axial movements in opposite axial directions.

46. The apparatus defined in claim 37, further including means for controlling said scanning means to produce a delay between successive ones of said repeated axial movements.

47. The apparatus defined in claim 37, wherein said circular inductor coil surface faces radially outwardly.

* * * * *

UNITED STATES PATENT AND TRADEMARK OFFICE
CERTIFICATE OF CORRECTION

PATENT NO. : 4,894,501

DATED : January 16, 1990

INVENTOR(S) : George D. Pfaffmann; Norbert R. Balzer; George M. Mucha; Donald E. Novorsky It is certified that error appears in the above-identified patent and that said Letters Patent is hereby corrected as shown below:

TITLE PAGE, Item [75] Inventors: should read --George D. Pfaffmann, Farmington; Norbert R. Balzer, Troy, Mich; George M. Mucha, Parma Hts.; Oh, Donald E. Novorsky, Pleasant Ridge, MI. -- Item [63], line 1, "Ser. No. 185,588" should read --- Ser. No. 184,588 ---. Column 1, line 25, "workpiece" should read --- workpieces ---; line 63, "outer most" should read --- outermost ---. Column 3, line 9, "axial" should read --- axially --; line 11, "is" should read --- are ---; line 14 "axially" should read --- axial ---. Column 8, line 42, "100" should read --- 101 ---. Column 10, line 13, "182" should read --- 180 ---. Claim 7, line 3, "that" should read --- than ---. Claim 19, line 3, "axially" should read --- axial---. Claim 23, line 3, "piece" should read --- workpiece ---. Claim 27, line 1, "Whrein" should read --- wherein ---. Claim 45, line 2, "mens" should read --- means ---.

Signed and Sealed this

Thirty-first Day of December, 1991

*Attest:*

HARRY F. MANBECK, JR.

*Attesting Officer*     *Commissioner of Patents and Trademarks*